July 21, 1931.  G. W. BAUGHMAN  1,815,031
TRACK CIRCUITS FOR ALTERNATING CURRENT ELECTRIC RAILWAYS
Filed Feb. 19, 1931
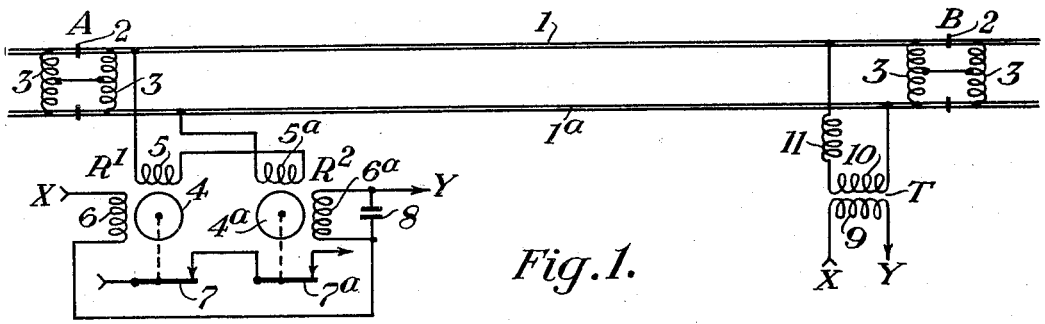
Fig. 1.
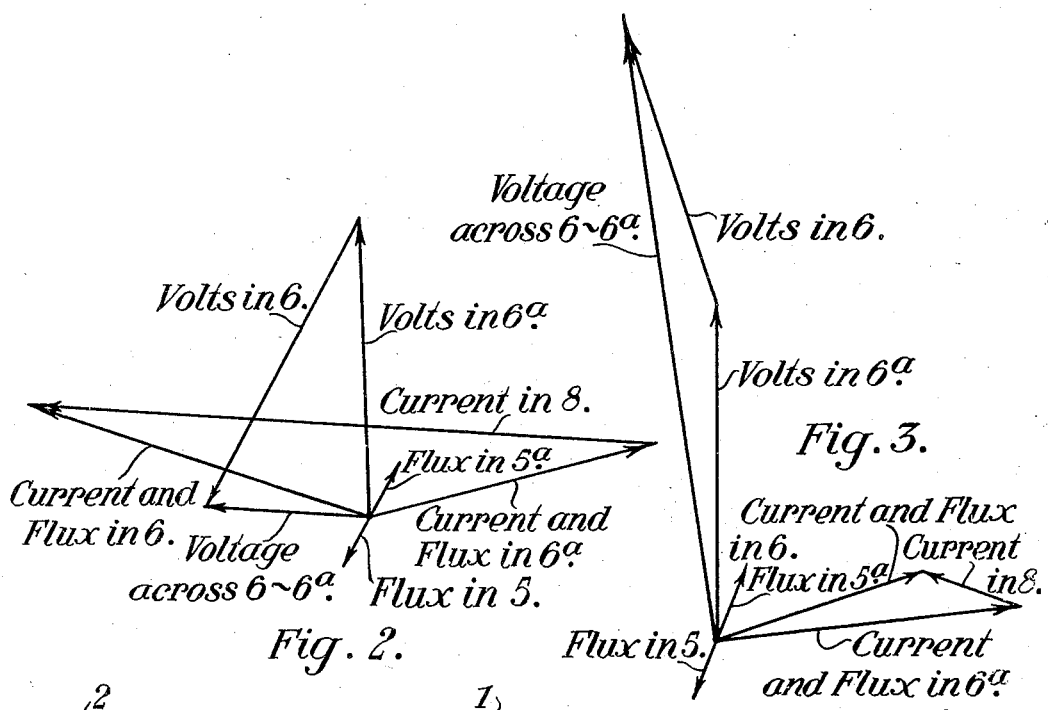
Fig. 2.
Fig. 3.
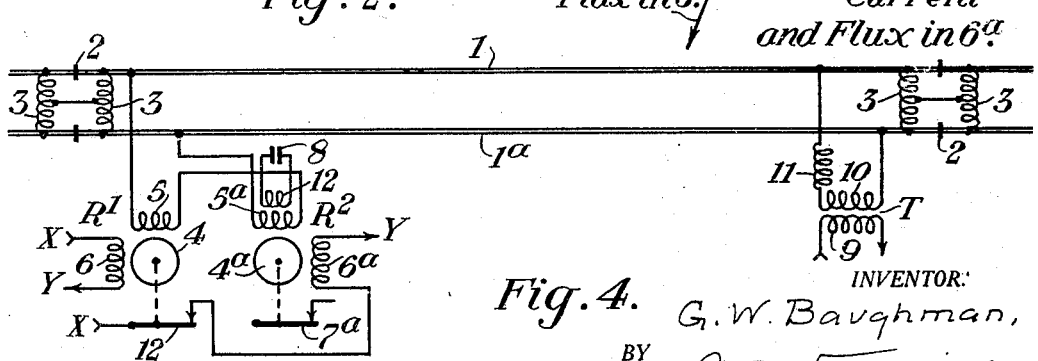
Fig. 4.
INVENTOR:
G. W. Baughman,
BY
His ATTORNEY.

Patented July 21, 1931

1,815,031

UNITED STATES PATENT OFFICE

GEORGE W. BAUGHMAN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

TRACK CIRCUITS FOR ALTERNATING CURRENT ELECTRIC RAILWAYS

Application filed February 19, 1931. Serial No. 516,922.

My invention relates to track circuits for alternating current electric railways, and has for an object the provision of a track circuit comprising two relays, which are individually not selective as to frequency, but which are connected and arranged in such manner that the combination will respond selectively to alternating current of track circuit frequency, and not to alternating current of the propulsion frequency.

I will describe two forms of track circuits embodying my invention, and will then point out the novel features thereof in claims.

In the accompanying drawings, Fig. 1 is a diagrammatic view showing one form of track circuit embodying my invention. Fig. 2 is a vector diagram illustrating the conditions existing in relays $R^1$ and $R^2$ when the windings of these relays are supplied with alternating current of track circuit frequency. Fig. 3 is a vector diagram illustrating the conditions existing in the track relays of Fig. 1 when the windings of these relays are supplied with alternating current of propulsion frequency. Fig. 4 is a diagrammatic view showing a modification of the apparatus shown in Fig. 1 and also embodying my invention.

Similar reference characters refer to similar parts in Figs. 1 and 4.

Referring first to Fig. 1, the reference characters 1 and $1^a$ designate the track rails of an alternating current electric railway, which rails are divided into track sections by insulated joints 2. The usual inductive bonds 3 are provided to conduct the propulsion current around these joints.

Alternating track circuit current of a frequency differing from that of the propulsion current is supplied to the rails of section A—B by a transformer T, the primary 9 of which is connected with terminals X and Y of the source of track circuit current (not shown in the drawings), and the secondary 10 of which is connected across the track rails through a current-limiting impedance 11. As examples, the propulsion current may be 25 cycles per second and the track circuit current may be 100 cycles per second.

The reference characters $R^1$ and $R^2$ designate two track relays of the induction motor type. Relay $R^1$ comprises a rotor 4, a track winding 5, and a local winding 6. The rotor 4 controls a contact 7 in such manner that this contact is closed when a positive torque is developed in the relay, and opened when a reverse torque is developed in the relay and also when either winding of the relay is deenergized. Relay $R^2$ is similar in all respects to relay $R^1$, and the parts of this relay are designated by the same reference characters as those applied to the corresponding parts of relay $R^1$, with the exception that the exponent "a" has been added.

The two track windings 5 and $5^a$ are connected in series across the track rails 1 and $1^a$, and these two windings are oppositely connected in the series circuit, so that the flux due to the winding $5^a$ is 180° from the flux due to current in winding 5. The local windings 6 and $6^a$ are connected in series and are normally supplied with current of track circuit frequency from terminals X and Y of the source of this current. A condenser 8 is connected in multiple with winding $6^a$. Contracts 7 and $7^a$ of the two relays are connected in series in a circuit which may be used for any suitable purpose, such, for example, as governing traffic through section A—B.

Referring now to Fig. 2, I will assume that all windings of both track relays are supplied with current of track circuit frequency. The voltage across the terminals of winding $6^a$ will produce a current through this winding which lags behind the voltage by an amount somewhat less than 90°. This voltage across winding $6^a$ is also applied to the condenser 8 and the condenser current will lead the voltage across the winding $6^a$ by approximately 90°. Condenser 8 is so chosen that its capacity is about twice that required for multiple resonance with the winding $6^a$ at the frequency of the track circuit current. The resultant of the currents in winding $6^a$ and condenser 8 is, therefore, substantially equal in numerical value to the current in winding $6^a$ but this resultant current is displaced substantially 180° from the current in winding $6^a$. This resultant current flows through winding 6, and it is therefore apparent that windings 6 and 6ª are energized by currents of substantially the same value, but that the current in winding 6 leads that in winding 6ª by almost 180°. The voltage across winding 6 is substantially equal in numerical value to that across winding 6ª, because the windings are similar and the currents through them are substantially equal. The voltage across winding 6 leads the current through this winding by somewhat less than 90°. The vector sum of the voltages across windings 6 and 6ª is the voltage from the source of track circuit current required to produce the voltages across windings 6 and 6ª. The reason for this resultant voltage being less than the individual voltage across either winding 6 or 6ª, is that the resultant reactance of winding 6ª and condenser 8 is capacitive, and this capacitive reactance produces substantially series resonance with the inductive reactance of winding 6. The result is that at the track circuit frequency a relatively small voltage across the two windings 6 and 6ª in series will produce a relatively large voltage across each winding, and the currents through these windings will be substantially 180° apart. The fluxes produced by these windings will bear the same phase relation as that which exists between the currents in these windings, and so we may assume that the flux due to winding 6ª is in phase with the current through this winding, and that the flux due to winding 6 is in phase with the current therethrough. As stated hereinbefore, the windings 5 and 5ª are connected in series in such manner that the flux due to the winding 5 is displaced at 180° from that due to winding 5ª. The cooperation of the fluxes due to windings 5ª and 6ª will produce a torque on rotor 4ª, and likewise the cooperation of the fluxes due to windings 5 and 6 will produce a torque on the rotor 4. As illustrated in Fig. 2, the torques on the two rotors will be in the same direction, because the flux due to winding 5ª leads the flux due to winding 6ª, and the flux due to winding 5 leads the flux due to winding 6. It follows that when the track section is unoccupied, and all of the relay windings are energized by normal values of currents at track circuit frequency, positive or normal torque will be developed by each relay so that both contacts 7 and 7ª will be closed.

I will now assume that all of the relay windings are applied with currents of the propulsion frequency. This may occur, for example, when the propulsion current is unbalanced in the two rails, so that it produces a difference of potential across the track windings 5 and 5ª and across the secondary 10 of transformer T. Propulsion current may then be supplied to the local windings 6 and 6ª through the transformer T and the transmission line which supplies current of track circuit frequency to the system. The conditions will then be as illustrated in Fig. 3. The impedance of winding 6ª at the propulsion frequency is less than at the track circuit frequency, and the impedance of condenser 8 at propulsion frequency is greater than at track circuit frequency. The resultant of the currents in winding 6ª and condenser 8 will therefore be substantially equal to the current in 6ª and also very nearly in phase with the current in 6ª. The voltage across winding 6 due to this resultant current will be somewhat less than 90° ahead of the resultant current. The vector sum of the voltage across the windings 6 and 6ª will be very nearly equal to the numerical sum of these voltages, which is several times the voltage required to maintain the individual voltages across windings 6 and 6ª at track circuit frequency. Again assuming that the fluxes are in phase with the currents in the windings which produce them, it will be seen that the flux due to winding 5ª leads that due to winding 6ª, with the result that relay R² will still develop a positive torque. The flux due to winding 5, however, lags behind that due to winding 6, so that a reverse torque will be developed in relay R¹, with the result that contact 7 will be positively moved to the open position.

The apparatus shown in Fig. 1 is immune to a false-clear indication due to the failure of any element in the track circuit. An open circuit in condenser 8 will place the fluxes due to windings 6 and 6ª in phase, and since the fluxes in windings 5 and 5ª are 180° apart, one of the relays will develop a reverse torque. If a short circuit should occur in condenser 8, winding 6ª will be shunted by path of low resistance, so that no torque will be developed in relay R². Of course, a break in any one of the relay windings, or a short-circuit across any one of these windings, will result in at least one of the relays becoming deenergized.

Referring now to Fig. 4, the apparatus shown in this view is the same as that shown in Fig. 1, except that the condenser 8 is connected in multiple with the track winding 5ª of relay R². On account of the relatively low voltage across this winding, a secondary 12 is placed in inductive relation with winding 5ª to form a step-up transformer, and condenser 8 is connected across the terminals of winding 12. Furthermore, winding 6 is connected directly across the terminals X and Y of the source of track circuit current, but winding 6ª is supplied with current from these terminals through a front contact 12 of relay R¹, so that contact 7ª alone may be used for the control of suitable traffic governing apparatus. The vector diagrams of Figs. 2 and 3 apply to the track windings 5 and 5ª of the apparatus shown in Fig. 4, and the operation of this apparatus under the various conditions will be the same as that of the apparatus shown in Fig. 1.

Although I have herein shown and described only two forms of apparatus embodying my invention it is understood that various changes and modifications may be made therein within the scope of the appended claims without departing from the spirit and scope of my invention.

Having thus described my invention, what I claim is:

1. In combination, a section of railway track carrying alternating propulsion current, a source of alternating track circuit current connected with the rails of said section and differing from the propulsion current in frequency, two induction motor track relays for said section each having a track winding and a local winding, the two track windings being supplied with current from the rails of said section, means for normally supplying said two local windings with alternating current of the same frequency as that of the track circuit current, and means associated with one winding of one relay for causing one relay to develop a reverse torque in the event that current of the propulsion frequency reaches the windings of said relays.

2. In combination, a section of railway track carrying alternating propulsion current, a source of alternating track circuit current connected with the rails of said section and differing from the propulsion current in frequency, two induction motor track relays for said section each having a track winding and a local winding, the two track windings being supplied with current from the rails of said section, means for normally supplying said two local windings with alternating current of the same frequency as that of the track circuit current, and a condenser connected in multiple with one winding of one of said relays, the parts being so connected and proportioned that when current of track circuit frequency is applied to all of said relay windings a positive torque is developed by both relays but that if current of propulsion frequency reaches the relay windings a reverse torque will be developed by one relay.

3. In combination, a section of railway track carrying alternating propulsion current, a source of alternating track circuit current connected with the rails of said section and differing from the propulsion current in frequency, two induction motor track relays for said section each having a track winding and a local winding, the two track windings being supplied with current from the rails of said section, means for normally supplying said two local windings with alternating current of the same frequency as that of the track circuit current, and a condenser connected in multiple with the local winding of one of said relays, the parts being so connected and proportioned that when current of track circuit frequency is applied to all of said relay windings a positive torque is developed by both relays but that if current of propulsion frequency reaches said local and track windings a reverse torque will be developed by one relay.

4. In combination, a section of railway track carrying alternating propulsion current, a source of alternating track circuit current connected with the rails of said section and differing from the propulsion current in frequency, two induction motor track relays for said section each having a track winding and a local winding, the two track windings being supplied with current from the rails of said section, means for normally supplying said two local windings with alternating current of the same frequency as that of the track circuit current, and a condenser connected in multiple with the track winding of one of said relays, the parts being so connected and proportioned that when current of track circuit frequency is applied to all of said relay windings a positive torque is developed by both relays but that if current of propulsion frequency reaches the relay windings a reverse torque will be developed by one relay.

5. In combination, a section of railway track carrying alternating propulsion current, a source of alternating track circuit current connected with the rails of said section and differing from the propulsion current in frequency, two induction motor track relays for said section each having a track winding and a local winding, the two track windings being supplied with current from the rails of said section, means for normally supplying said two local windings with alternating current of the same frequency as that of the track circuit current, and a condenser connected in multiple with one winding of one of said relays, the parts being so proportioned that when current of track circuit frequency is applied to all of said relay windings a positive torque is developed by both relays but that if current of propulsion frequency reaches the relay windings the current in one winding of the relay not provided with the condenser is swung through substantially 180° so that a reverse torque is developed by one relay.

In testimony whereof I affix my signature.

GEORGE W. BAUGHMAN.